UNITED STATES PATENT OFFICE.

DAVID V. KYTE, OF INDIANAPOLIS, INDIANA, ASSIGNOR TO C. AMORY STEVENS, OF NEW YORK, N. Y.

MANUFACTURE OF WHITE LEAD.

SPECIFICATION forming part of Letters Patent No. 459,946, dated September 22, 1891.

Application filed July 5, 1890. Serial No. 357,886. (No specimens.)

*To all whom it may concern:*

Be it known that I, DAVID V. KYTE, a citizen of the United States, residing in Indianapolis, in the county of Marion and State of Indiana, have invented certain new and useful Improvements in the Manufacture of White Lead, of which the following is a description sufficient to enable others skilled in the art to which the invention appertains to use the same.

My invention relates to the manufacture of hydrated lead carbonate (known in commerce as "white lead") by the aid of an electrical current. I am aware that electricity has heretofore been employed for this purpose, as in Letters Patent No. 292,119, dated January 15, 1884, issued to Johann K. Kessler, and Letters Patent No. 414,935, dated November 12, 1889, issued to T. D. Bottome, in both of which metallic lead is decomposed in an alkaline electrolyte into an oxygen-bearing salt of the metal, after which an attempt is made to convert the said salt into hydrated lead carbonate by the introduction of carbon dioxide into the electrolyte. But only a very small percentage of the hydroxide of lead formed in the electrolyte under electrical action is precipitated upon the introduction of the carbonic-acid gas in either of the cases referred to for the reason that such salts are soluble in the electrolytic solution, and are retained thereby under the conditions heretofore existing.

A leading feature of my invention consists in making the oxygen-bearing salts of lead insoluble in an acid electrolyte after their formation under the influence of an electrical current by rendering the electrolyte neutral, or nearly so, in which condition practically all of the hydroxide of lead present will be converted into hydrated lead carbonate upon the introduction of carbon dioxide. By thus neutralizing the electrolyte at the proper stage in the process I render the manufacture of white lead by the aid of electricity practical and profitable in a commercial sense—a result not heretofore attained, since, while the use of electricity in this connection has been experimentally successful on a small scale, the precipitation of hydroxide of lead has been so slight as compared with the quantity held in solution in the electrolyte as to render the process unprofitable and impractical commercially.

My invention is designed for and adapted to the production of a higher grade of hydrated lead carbonate, free from deleterious substances, in a more rapid and economical manner than has heretofore been attained; and the invention consists, primarily, in the following correlated steps in the process of manufacture, to wit: the electrical decomposition of metallic lead in an acid electrolyte into an oxygen-bearing salt of the metal, the neutralization of the electrolyte after it has become charged with the oxygen-bearing salts of lead, and the conversion of the said oxygen-bearing salts into hydrated lead carbonate and the precipitation thereof by the introduction of carbon dioxide either free or combined with the electrolyte. In order to thus attain a pure high grade of white lead, it is essential that all traces of silver shall be eliminated from the lead during the process. In the manufacture of white lead by any of the processes which use metallic lead for this purpose, if lead bullion or lead with only a very small percentage of silver be used the article produced is of a very inferior grade, owing to the presence of the salts of silver, these salts, under the influence of light and air, turning black and giving the whole mass a smudgy or dirty appearance. Hence the necessity under the old methods of using lead which has been submitted to some process of desilverization. In this connection my invention includes, as a step in the process when metallic lead contaminated with silver (as is usually the case) is used, the elimination of the silver from the electrolyte by means of electro-deposition, a current of electricity of suitable intensity being passed through the electrolyte after it has become charged with the lead and silver in solution and prior to the neutralization of the electrolyte, the result being that the silver is thereby collected on a suitable cathode. By my new method of treatment the field of manufacture of white lead is thus extended to include lead bullion or silver bearing lead and the electrical elimination of the silver directly from the solution of the decomposed bullion, and as an essential step in the process when silver is present is an important advance in the manufacture of a high-grade article of hydrated lead carbonate.

It will be seen that by my method an acid electrolyte is used, and distinguishing features of my invention consist in the absence from the electrolyte of carbon dioxide until after the electrolyte is charged or saturated with the oxygen-bearing salt and in the neutralization of the electrolyte prior to the introduction of the carbon dioxide in order to provide for and insure the complete precipitation of the lead carbonate as formed.

In my process of manufacture I am enabled to use as or in the electrolyte all the acids—as, for instance, nitric acid, ($HNO_3$,) acetic acid, ($HC_2H_3O_2$,) sulphuric acid, ($H_2SO_4$,) hydrochloric acid, (HCl,) carbonic acid, ($H_2CO_3$,) oxalic acid,($H_2C_2O_4$,) tartaric acid, ($H_2C_4H_4O_6$,) and citric acid, ($H_3C_6H_5O_7$.)

By investigation and experiment I have discovered that while metallic lead may be decomposed in solutions of all the substances named by aid of the electric current some of them are better adapted to the work of decomposing the lead and allowing its conversion to the state of hydrated lead carbonate with greater facility than others, this being due to the peculiarities of chemical affinity existing in the elements entering into the various substances; that when metallic lead is converted into an oxygen-bearing salt of the metal by aid of the electric current with any of the above substances the nature of the solution can be so changed by diluting it and bringing it to or near the point of neutrality that the hydrated lead carbonate will remain within it when formed by the addition of carbonic-acid gas (either with or without pressure) in an insoluble state. I have discovered that this electrical decomposition of metallic lead is produced with the greatest facility in an acid electrolyte, especially one containing nitric acid, ($HNO_3$;) also, that the compound of lead which is formed when metallic lead is electrically decomposed in the solutions of the substances just mentioned is most readily converted to the state of hydrated lead carbonate when the solution of the substance in which it has been decomposed is rendered neutral, owing to the fact that hydrated lead carbonate is soluble in solutions which are highly acid and insoluble in neutral solutions.

In utilizing nitric acid to effect the decomposition of the lead into oxygen-bearing salts, &c., the electrolyte should be prepared by diluting three hundred cubic centimeters of chemically pure nitric acid or its equivalent in the commercial article with two thousand cubic centimeters of water. This is placed in a suitable glass, porcelain, or wooden vessel. The electrodes are metallic lead in any form, either lead bullion or pure, and for this amount of the electrolyte solution I prefer a plate one-eighth inch thick and three and one-half inches square for the anode. The cathode may be of lead and of the same dimensions, or of carbon or other suitable material of sufficient surface to be the equivalent of the anode in conductivity. The electrodes are immersed in the electrolyte and connected with a source of electricity and a current of, say, ten ampères per square foot of anode surface passed through the electrolyte. The lead anode is rapidly decomposed into a compound of lead, which remains in solution until the electrolyte is thoroughly saturated, which occurs after from ten to twenty minutes passing of such current. When the point of saturation is reached, fine crystals of metallic lead will be seen commencing to attach themselves to the cathode. When this occurs, the current of electricity should be stopped and the electrodes removed. If lead containing silver has been dissolved, the silver should then be collected and removed from the electrolyte by electro-deposition, as hereinbefore set forth. In the absence of silver in the electrolyte or after its elimination therefrom sufficient caustic soda or potash, (sodium or potassium hydroxide,) or preferably a mixture of the two, should now be added to render the solution neutral, care being taken to add only enough to bring the electrolyte to neutrality, as in highly alkaline solutions the hydrated lead carbonate cannot be precipitated, and that which is precipitated in only slightly alkaline solutions has such a decided alkaline reaction as to unfit it for the purposes for which white lead is used. As the electrolytic solution approaches the neutral state its color becomes milky-white from the formation of plumbic hydroxide, and if any carbonic-acid gas be present, as is frequently the case to a greater or less extent in water which has not been subjected to some process of purification, a small curdy precipitate of hydrated lead carbonate will be seen falling to the bottom of the vessel; but this carbonic-acid gas is not naturally present in sufficient quantity to convert any great amount of the plumbic hydroxide to the state of hydrated lead carbonate, and for this purpose it must be added to the electrolyte, which may be done either with slight pressure or without. When the electrolyte is saturated with free carbonic-acid gas, the conversion of the plumbic hydroxide to the state of hydrated lead carbonate is very rapid to the extent of about two-thirds of the weight of the plumbic hydroxide. The precipitate may now be removed from the electrolyte and prepared for market.

The chemical changes which have taken place under the above manipulations are explained in the following equations:

First. On passing the electric current through the nitric-acid electrolyte with lead electrodes I have $6Pb + 12HNO_3 = 6Pb(NO_3)_2 + 12H$, the hydrogen being set free from the decomposed bath, and lead nitrate remaining in solution within it. The removal of the salts of silver from the electrolyte, if present therein, by electrolysis is here effected in the manner as hereinbefore set forth.

Second. On the addition of the caustic solution I have $6Pb(NO_3)_2 + 12KOH = 3Pb_2O(OH)_2 + 12KNO_3 + 3H_2O$, the lead nitrate being converted into lead hydroxide with the formation of the potassium nitrate and water.

Third. On the addition of the carbonic-acid gas I have $3Pb_2O(OH)_2 + 4CO_2 = H_2O + 4PbCO_3 + 2Pb(OH)_2 = 2(2PbCO_3Pb(OH)_2)$, the lead hydroxide being converted into hydrated lead carbonate.

Carbonates of the alkalies (sodium or potassium preferably) may be used to neutralize the acid, thus introducing at the same time carbonic acid in a combined form. In this case the reaction is between the oxygen-bearing salt of lead which has been produced by electrical action, the acid of the bath, and the carbonate salt; but while these methods of conducting the process are operative in practice it is preferable to introduce the carbonic-acid gas in a free state, for which purpose it may be made in any of the well-known manners, as by the burning of limestone, the destruction of a carbonate with an acid, &c. It should be introduced into the electrolyte immediately after it has been rendered into a condition in which the lead carbonate may exist within it in an insoluble state by neutralization. When the electrolyte becomes charged with the oxygen-bearing salts of lead, if an electrode has been used which contains silver the silver is also decomposed and is in solution, providing that the electrolyte is a solvent for the silver, in which case the silver must be eliminated from the electrolytic bath by passing a suitable current of electricity through it with a carbon anode and silver cathode, the silver being deposited in a metallic state on the cathode. In cases where the silver is not soluble in the electrolyte it falls to the bottom of the vessel and is removed as an impurity from the bath. This separation is necessary where it is desired to produce a high-grade article of white lead.

The removal of the silver by electro-deposition, as above set forth, is effected prior to the neutralization of the electrolyte and the introduction of the carbon dioxide.

It is to be noted that my process is made up of a series of independent successive steps, in each of which the complete chemical reaction desired takes place unimpeded by the presence of substances necessary in effecting other reactions in the process, as in the case of the patents to Bottome and Kessler, hereinbefore mentioned, in which all the ingredients are present together in the electrolye and act and react on each other until the solution becomes clogged and inoperative, when it has to be discarded, thus entailing considerable and unnecessary waste of material and rendering the process unprofitable. By my method of treating each reaction separately practically all the material is utilized and a purer and cheaper product is obtained than has heretofore been possible.

It is to be understood that I do not confine myself strictly to the relative proportions of substances or to the exact manner of manipulation herein set forth by way of illustrating the practical utilization of my improvements, since it is obvious that various modifications may be introduced into the process without deviating materially from the essential features of my invention.

I am aware that in what is known as the "Riffault process" of manufacturing white lead from peroxide of lead, &c., the solution of oxide of lead is neutralized prior to the introduction of the carbon dioxide, and I do not herein seek to cover the feature of neutralization, excepting only as an essential step in the successful manufacture of white lead by electrolysis.

What I claim as my invention, and desire to secure by Letters Patent, is—

1. The process of manufacturing hydrated lead carbonate, substantially as set forth, consisting in decomposing a metallic lead anode by a current of electricity in an acid electrolyte to form oxygen-bearing salts of lead, then rendering the electrolytic solution neutral, or nearly so, and treating the electrolyte with carbon dioxide, for the pupose described.

2. The process of manufacturing hydrated lead carbonate from lead bullion, consisting in dissolving the same by a current of electricity in an electrolytic solution to form oxygen-bearing salts, removing the silver from the electrolytic solution by electro-deposition, rendering the remaining solution neutral, or nearly so, and treating the electrolyte with carbon dioxide, for the purpose and substantially in the manner set forth.

DAVID V. KYTE.

Witnesses:
CALEB G. COLLINS,
GEO. W. MIATT.